United States Patent [19]

Inoue

[11] Patent Number: 4,539,458
[45] Date of Patent: Sep. 3, 1985

[54] NON-IMMERSION EDM METHOD AND APPARATUS

[75] Inventor: Kiyoshi Inoue, Tokyo, Japan

[73] Assignee: Inoue-Japax Incorporated, Yokohamashi, Japan

[21] Appl. No.: 440,320

[22] Filed: Nov. 9, 1982

[30] Foreign Application Priority Data

Nov. 11, 1981 [JP] Japan ................. 56-181567
May 21, 1982 [JP] Japan .................. 57-87134

[51] Int. Cl.³ .................. B23P 1/08/1; B23P 16
[52] U.S. Cl. ................. 219/69 M; 219/69 D
[58] Field of Search ........... 219/69 D, 69 R, 69 E, 219/69 M, 69 G; 204/129.25, 129.5, 129.75, 129.80, 129.85

[56] References Cited

U.S. PATENT DOCUMENTS

| | | | |
|---|---|---|---|
| 2,427,588 | 9/1947 | Burnett | 219/69 E |
| 2,526,423 | 10/1950 | Rudorff | 219/69 D |
| 2,996,602 | 8/1961 | Webb | 219/69 D |
| 3,095,364 | 6/1963 | Faust et al. | 204/129.5 |
| 3,334,210 | 8/1967 | Williams et al. | 219/69 D |
| 3,626,137 | 11/1971 | Bertolasi | 219/69 D |
| 3,851,135 | 11/1974 | Moracz et al. | 219/69 E |
| 3,878,352 | 4/1975 | Inoue | 219/69 D |
| 4,097,710 | 6/1978 | Maillet | 219/69 M |
| 4,208,256 | 6/1980 | Inoue | 219/69 D |

FOREIGN PATENT DOCUMENTS

| | | | |
|---|---|---|---|
| 2851482 | 5/1979 | Fed. Rep. of Germany | 204/129.75 |
| 2477051 | 9/1981 | France | 219/69 M |
| 56492 | 5/1977 | Japan | 219/69 D |
| 56-45331A | 4/1981 | Japan | 219/69 D |
| 55-51335 | 11/1981 | Japan | 219/69 M |
| 789293 | 1/1958 | United Kingdom . | |
| 2074074A | 10/1981 | United Kingdom . | |
| 682347 | 8/1979 | U.S.S.R. | 219/69 D |
| 698745 | 11/1979 | U.S.S.R. | 219/69 D |

Primary Examiner—Roy N. Envall, Jr.
Assistant Examiner—Geoffrey S. Evans
Attorney, Agent, or Firm—Karl F. Ross; Herbert Dubno

[57] ABSTRACT

A novel EDM method and apparatus for forming a relatively large cavity in a workpiece with a tool electrode complementary in shape with the cavity. Unlike the conventional EDM arrangement in which the machining gap is deeply immersed in a dielectric fluid in a worktank, the machining gap according to the invention is defined so as to be substantially contiguous to the atmospheric air in the worktank. The gap is supplied with a water-based machining liquid which, upon entraining gap discharge products, is allowed to scatter into the atmospheric air in the worktank so that substantially no debris of the discharge products stagnates in the machining gap, thereby assuring an enhanced machining efficiency.

15 Claims, 5 Drawing Figures

NON-IMMERSION EDM METHOD AND APPARATUS

FIELD OF THE INVENTION

The present invention relates to electrical discharge machining (EDM) and, more particularly, to a novel EDM method and apparatus for machining an electrically conductive workpiece with a tool electrode to form a cavity in the workpiece, the tool electrode having a machining surface of a substantial area complementary with the cavity.

BACKGROUND OF THE INVENTION

The EDM process of the particular type described has commonly been carried out in the past in a dielectric fluid such as kerosene or transformer oil retained in a worktank. A workpiece is deeply immersed in the dielectric fluid in the worktank and a tool electrode also dips into the dielectric fluid and spacedly juxtaposed within the workpiece. The machining gap defined between the tool electrode and the workpiece is thus deeply immersed in the dielectric fluid in the worktank. A succession of electrical discharges are effected between the tool electrode and the workpiece across the machining gap to electroerosively remove material from the workpiece. As material removal proceeds, the tool electrode is advanced into the workpiece until the required depth of a desired cavity is reached.

While the conventional method described has been found to be generally satisfactory and acceptable for commercial purposes, there is consistent desire to increase the removal rate and in general the machining efficiency. In addition, it should be noted that the dielectric fluid of the type described is highly inflammable so that a number of measures are required to prevent a fire and to fight a fire if one happens to breakout. On the other hand, in wire-cut EDM, a type of EDM quite different in machining mode from cavity-sinking EDM, it has been the common practice to employ as the machining fluid pure or distilled water which is not inflammable at all. Thus, attempts have been made to employ the pure or distilled water machining fluid in the cavity-sinking EDM process. It has been found, however, that the cavity-sinking efficiency obtained with the water fluid is much inferior to that obtainable with kerosene or transformer oil.

OBJECTS OF THE INVENTION

The present invention seeks to provide a new and improved EDM method of the type described which method is entirely free from the danger of a fire and yet enables achievement of cavity sinking efficiency comparable with or even superior to that attainable with kerosene or transformer oil.

The present invention also seeks to provide a novel and improved EDM apparatus or arrangement for carrying out the new EDM method described.

SUMMARY OF THE INVENTION

In accordance with the present invention there is provided, in a first aspect thereof, an EDM method of machining an electrically conductive workpiece to form a cavity therein, which method comprises the steps of: (a) spacedly juxtaposing a tool electrode with the workpiece in a worktank to define a machining gap between the tool electrode and the workpiece so as to be substantially contiguous to an atmospheric air in the worktank, the tool electrode having a machining surface complementary in shape with the desired cavity and being of an area in excess of 2 $cm^2$; (b) supplying a machining fluid to the machining gap and discharging it directly from the machining gap into the atmospheric air in the worktank, the machining fluid being a water-based liquid; (c) effecting a succession of electrical discharges between the tool electrode and workpiece across the machining gap to electroerosively remove material from the workpiece while permitting gap discharge products to be entrained in the machining fluid and to pass therewith into the atmospheric air in the worktank; and (d) relatively displacing the tool electrode and the workpiece while maintaining the machining gap substantially constant to advance machining in the workpiece.

Preferably, in step (c), the machining fluid is supplied into the machining gap at a volume flow rate ranging between 10 and 1000 cc/min, preferably between 50 and 500 cc/min.

Specifically, the method of this invention may be carried out so that the workpiece is disposed in the worktank so as to be surrounded by the atmospheric air and not immersed in the machining fluid.

The method of this invention may also be carried out in a way that such a volume of the machining fluid is retained in the worktank as to barely cover the workpiece disposed therein. The thickness of the machining fluid above the upper surface of the workpiece preferably ranges between 2 and 15 mm and more preferably between 2 and 10 mm.

The machining fluid may consist of 0 to 5% by weight of at least one hydrocarbon, 1 to 5% by weight at least one organic substance other than hydrocarbons and the balance essentially water. Such organic substances may be at least one of substances selected from the group which consists of a water-soluble silicone oil, ethylene glycol, polyethylene glycol, propylene glycol, glycerin, diethylene glycol, polyalkyl ether and a higher (fatty) alcohol. The organic substance is preferably a polyether denaturated silicone oil and can be defined as a non-ionic surface active agent.

The present invention also provides, in a second aspect thereof, an EDM apparatus for machining an electrically conductive workpiece to form therein a cavity of an area in excess of 2 $cm^2$ by means of a tool electrode having a machining surface complementary in shape with the cavity, which apparatus comprises; support means for spacedly juxtaposing a tool electrode with the workpiece in a worktank to define a machining gap between the tool electrode and the workpiece so as to be substantially contiguous to atmospheric air in the worktank, the tool electrode being of an area in excess of 2 $cm^2$; means for supplying a machining fluid into the machining gap so as to permit it to pass out of the machining gap into the atmospheric air in the worktank, the machining fluid being a water-based liquid; power supply means for effecting a succession of electrical discharges between the tool electrode and the workpiece across the machining gap to electroerosively remove material from the workpiece while permitting gap discharge products to be entrained in the machining fluid and to pass therewith into the atmospheric air in the worktank; and means for relatively displacing the tool electrode and the workpiece while maintaining the machining gap substantially constant to advance machining in the workpiece.

BRIEF DESCRIPTION OF THE DRAWING

These and other features of the present invention as well as advantages thereof will become more readily apparent from a reading of the following description of certain embodiments thereof when taken with reference to the accompanying drawing in which.

SPECIFIC DESCRIPTION

Figure 1:
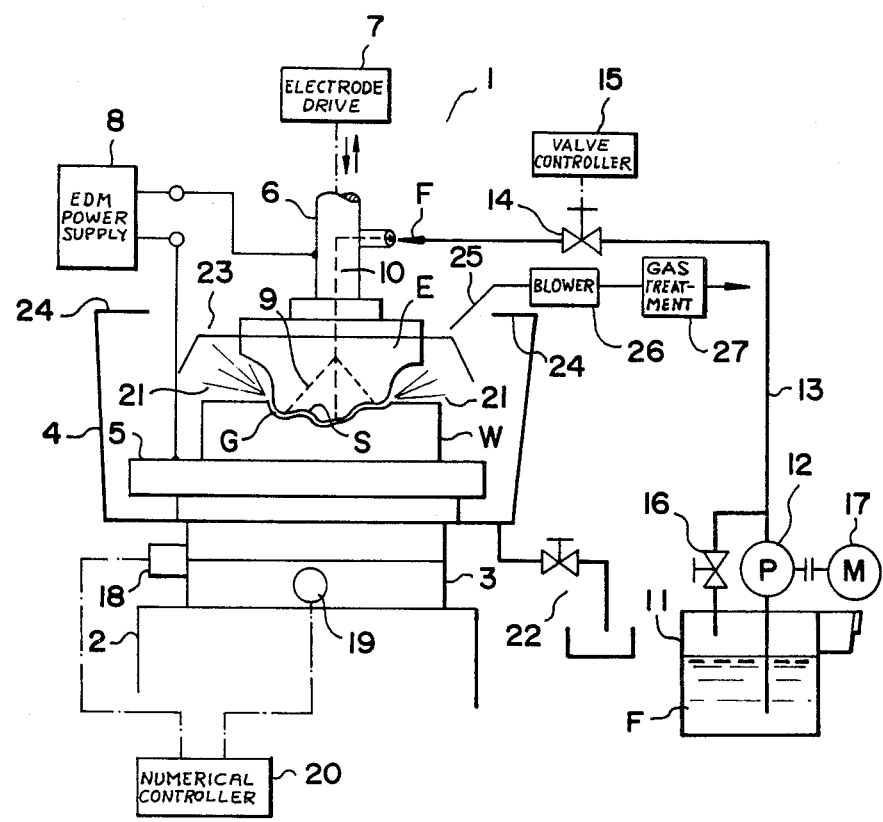
FIG. 1 is a view, partly side elevational and partly schematic, illustrating an embodiment of the present invention in which the workpiece is laterally surrounded by atmospheric air in the worktank.

Referring first to FIG. 1 there is shown an EDM apparatus 1 embodying the present invention. The apparatus 1 includes a machine bed 2 on which is mounted a cross-table 3 designed to carry thereon a worktank 4 displaceably in a horizontal or X-Y plane. In the worktank 4 an electrically conductive worktable 5 is secured in position to mount a workpiece W fixedly thereon. The workpiece W is shown as being machined with a tool electrode E in a novel method according to the present invention. The tool electrode E has a machining surface S spacedly juxtaposed with the workpiece W across an EDM gap G and shaped to be complementary to the contour of a cavity to be machined in the workpiece W. The tool electrode E is carried by a vertical stem 6 designed to be moved vertically up and down by a drive unit 7. The latter includes a servomechanism responsive to a gap variable, e.g. voltage across the machining gap, for displacing the tool electrode E so as to maintain the machining gap G substantially constant. Preferably, the drive unit 7 also includes an electrode reciprocation mechanism for intermittently retracting the tool electrode E while it is being fed by the servomechanism. The tool electrode E is electrically connected via the conductive stem 6 to one output terminal of an EDM power supply 8 whose other output terminal is electrically connected to the workpiece W via the conductive worktable 5.

Furthermore, the tool electrode E has a plurality of internal bores 9 respectively open to the machining gap G at spaced-apart locations on the electrode machining surface S. The internal bores 9 at their source sides merge into an inlet passage 10 which passes through the stem 6 for reception of a machining fluid F from a reservoir 11. A pump 12 is provided to draw the machining fluid F from the reservoir 11 and feeds it through a conduit 13 into the fluid inlet 10. A valve 14 is provided in the conduit 13 and is regulated by a control unit 15 to control the volume flow rate of the fluid F supplied into the machining gap G through the internal bores 9. A further valve 16 is provided to return a portion of the fluid F drawn by the pump 12 into the reservoir 11 and may be regulated to control the delivery pressure of the machining fluid F supplied into the EDM gap G. The pump 12 is driven by a motor 17.

The machining fluid F should, in the practice of the present invention, be constituted by a water-based liquid which is essentially not inflammable but which preferably excludes the use of pure or distilled water alone. Thus, in the practice of the invention, the machining liquid F preferably contains a small proportion, say, 0.1 to 5% by weight, of an organic substance, possibly also a small proportion, say, 0.1 to 5% by weight, of a hydrocarbon such as kerosene or transformer oil and the balance water. The water should preferably have a specific resistance ranging between $10^3$ and $10^5$ ohm-cm. The organic substance may be solid, say, in a powdery form but preferably is a water-soluble organic liquid which is further preferably a non-ionic surface active agent. One preferred example of the water-soluble organic substance for use in the present invention is a silicone oil and specifically a polyether denaturated silicone oil. Other examples of the water-soluble organic substance for use in the present invention include ethylene glycol and polyethylene glycol, although they are less efficient.

The cross-table 3 is driven by an X-axis motor 18 and a Y-axis motor 19 to displace the worktank 4 and hence the worktable 5 secured therein to position the workpiece W in a X-Y planar or horizontal coordinate system relative to a vertical axis of the tool electrode E or the longitudinal axis of the stem 6. The motors 18 and 19 may also be driven to translationally displace the workpiece W along a preselected orbital path in the X-Y plane in a finish-machining step. Thus, the tool electrode E and the workpiece W, in a first or rough-machining step, are relatively displaced by the drive unit 7 to cause the tool electrode E to penetrate into the workpiece W until the required depth of the cavity is reached and, in a second or finish-machining step, are relatively displaced by the motors 18 and 19 to cause the tool electrode effectively to move translationally in the X-Y plane perpendicular to the direction of the penetration. Preferably, both for positioning and translational displacement of the workpiece W, the motors 18 and 19 are driven under the commands of a numerical controller 20.

In accordance with an important feature of the present invention, it is essential that the machining gap G defined between the tool electrode E and the workpiece W be held substantially contiguous to a region of atmospheric air in the worktank 4, unlike the conventional arrangement in which the machining gap G is deeply immersed in the machining fluid or located deeply below the surface thereof in the worktank.

Under the stated or open to air gap condition, the machining fluid F in the method according to the present invention is supplied at a sufficient volume flow rate, preferably between 10 and 1000 cc/min, into the machining gap G from the reservoir 11 and is allowed to pass or splash directly into the atmospheric air from the machining gap G i.e. is dispersed directly into the ambient air. A succession of electrical pulses are applied from the EDM power supply 8 between the tool electrode E and the workpiece W to effect discrete, time-spaced electrical discharges across the machining gap G in the presence of the machining fluid F, thereby electroerosively removing material from the workpiece W. The splashing machining fluid F carrying therein the gap EDM products and sparks is illustrated and designated by numeral 21.

The splashes 21 of the machining fluid F out of the EDM gap are eventually allowed to fall by gravity directly onto the floor of the worktank 4 and/or first directly on the workpiece W and, flowing thereon, then to fall onto the floor of the worktank 4. The fluid F then flows down out of the worktank 4 into a drain unit or sump 22.

Disposed to overlie the tool electrode E and the workpiece W within the worktank 4 is a covering 23 in the form of a downwardly open box or hood to collect the spent machining fluid F, the gap EDM products and sparks splashing from the machining gap G. These substances collected by the cover 23 are allowed to fall by gravity partly onto the workpiece W and partly onto the floor of the worktank 4 and thence to flow down out of the worktank 4 into the drain unit 22. The worktank 4 has its wall sufficiently high so that the machining gap G is located sufficiently below the top thereof so that the splashes altogether are collected therein. To ensure this, there is further provided an inwardly projecting guard 24 around the top of the worktank 4. In addition, gases and mists evolving from the machining gap G and escaping the covering 23 are collected into a ventilator 25 communicating with a blower 26. The blower 26 is used to draw the gases and mists out of the worktank 4. A gas-treatment unit 27 may be provided to filter and treat these gases and mists for their disposal or emission upon being rendered harmless.

The tool electrode E may be composed of copper, a copper alloy or a tungsten alloy as is conventional but, it has been found that it should preferably be composed of carbon (graphite) or a sintered carbon (graphite) and metal (e.g. copper or iron) mixture. It has been found in general that an electrode material having higher heat-capacity or less heat-conductivity is preferred in the method of this invention.

While the EDM power supply 8 may be of the type which generates a uniform train of EDM pulses, it is preferred to employ, in the practice of the present invention, a power supply 8 which is capable of providing a succession of time-spaced trains of electrical pulses as shown, for example, in U.S. Pat. No. 4,288,675.

The machining fluid F is supplied to the machining gap G preferably through one or more internal bores formed in the tool electrode E, although it may be supplied through one or more passages formed in the workpiece W or by means of one or more nozzles disposed in the vicinity of the machining gap G.

The machining fluid F may be supplied either continuously or intermittently into the machining gap G. Furthermore, the intermittent supply of the machining fluid F into the machining gap G may advantageously be synchronized with the reciprocation or intermittent retraction of the tool electrode E so that the machining fluid F is supplied into the machining gap G selectively during the time period in which the tool electrode E is retracted.

EXAMPLE I

Using a graphite tool electrode having a specific resistance of $3.0 \times 10^3$ ohm-cm, a workpiece W composed of SKD-11 (Japanese Industrial Standard) was machined in a first run according to the conventional EDM method and in a second run according to the present invention with the novel EDM arrangement generally shown in FIG. 1. In each run, the tool electrode was poled positive and the workpiece was poled negative. The machining gap difined between the tool electrode and the workpiece had a maximum area of 50.24 cm². Machining conditions were fixed so as to yield a surface roughness of 50 to 60 $\mu$mRmax on the machine workpiece with a relative electrode wear of 1 to 2%.

In the first run, with the conventional EDM arrangement, the machining gap defined between the tool electrode and the workpiece was deeply immersed in a dielectric fluid which was constituted by a hydrocarbon oil of the kerosene family commonly available at a gas station. Machining proceeded at an average removal rate of 2.5 gr/min. Since the machining fluid was inflammable liquid, care had to be exercised to avoid a possible fire.

In the second run, according to the invention, the machining fluid was constituted by a water-base fluid consisting of 1% by weight a water-soluble silicon oil, specifically a polyether denaturated silicone oil, and the balance essentially pure or distilled water having a specific resistance of $3 \times 10^4$ ohm-cm. Such a liquid is not inflammable at all. The machining liquid was supplied into the machining gap at a volume flow rate of 50 to 100 cc/min. It was found that machining proceeded at an average removal rate of 3.9 gr/min., that is more then 50% greater than that obtained by the conventional EDM method to achieve the same surface finish with the same electrode wear ratio.

From the tests above it is seen that not only is the EDM method according to the present invention completely free from fire hazard but it provides much greater machining efficiency than the conventional EDM method described.

EXAMPLE II

Figure 2:
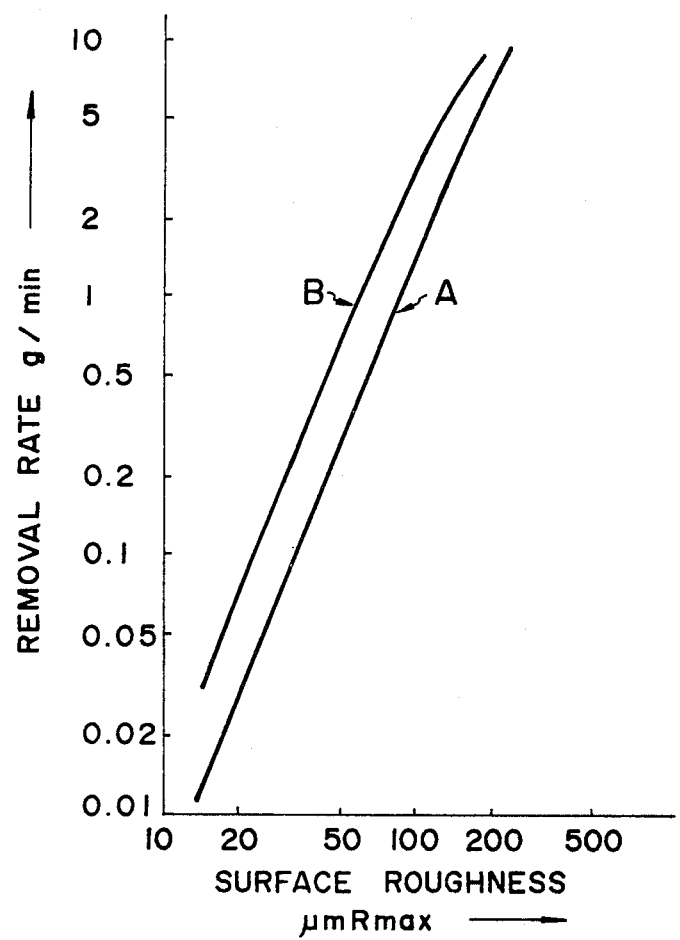
FIGS. 2 and 3 are graphical representations comparing removal rate and surface roughness relationship in a method of this invention with those in the conventional method.

EXAMPLE I was followed by varying machining conditions to compare the relationship between removal rate and surface roughness according to the EDM method of this invention with that according to the conventional EDM method. In the graph of FIG. 2 in which surface roughness in $\mu$mRmax is plotted along the abscissa and removel rate in g/min is plotted along the ordinate, curve A represents this relationship obtained with the conventional method and curve B represents that obtained according to the method of the present invention. The machining conditions were adjusted so as to yield a relative electrode wear or wear ratio of 1 to 3%. From the graph it is seen that there is obtained according to the present invention a marked improvement in removal rate for a given surface roughness or in surface finish for a given removal rate.

EXAMPLE III

Using a tool electrode composed of electric copper, a workpiece composed of SKD11 (Japanese Industrial Standard) was machined to form therein a cavity designed to constitute a forging die for a monkey wrench 100 mm long and 10 mm wide. The machining was carried out over two runs, the first according to the conventional EDM method mentioned in EXAMPLE I and the second according to the invention also mentioned in EXAMPLE I. Each of the runs comprised roughing and finishing steps. In the roughing step the tool electrode was periodically retracted with a period of 0.3 second while being advanced to follow up the stock removal from the workpiece until the required depth of the desired cavity was reached. In the finishing step, the roughing tool electrode was replaced by a similar tool electrode for finishing and the finishing tool electrode was displaced translationally along an orbit of a radius of 0.5 mm in the horizontal plane that is the plane perpendicular to the direction of advance in the roughing step. In both of the first and second runs, same respective pulse conditions were employed for each of the roughing and finishing steps. In the first run, it was found that it took 55 minutes for roughing and 60 minutes for finishing eventually to yield a finished surface of a roughness of 15 μmRmax. In the second run, it was found that it took 50 minutes for roughing and 50 minutes for finishing eventually to yield a finished surface of a roughness of 13 μmRmax.

EXAMPLE IV

Figure 3:
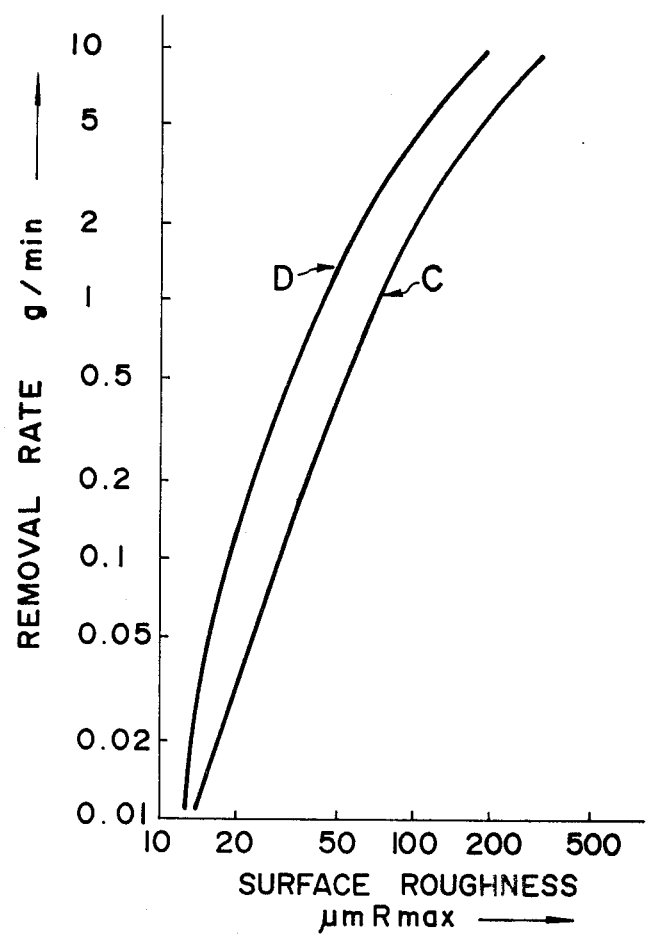

EXAMPLE III was followed by varying machining pulse conditions identically for the first and second runs to compare the relationship between removal rate and surface roughness according to the method of this invention with that according to the conventional EDM method. The test results were gathered into the graph of FIG. 3 in which again surface roughness in μmRmax is plotted along the abscissa and removal rate in g/min is plotted along the ordinate. In the graph of FIG. 3, the curve C represents this relationship obtained according to the conventional method and the curve D represents that obtained according to the method of the present invention. From the graph, it is again seen that there is obtained according to the present invention a marked improvement in removal rate for a given surface roughness and in surface finish for a given removal rate.

Figure 4:
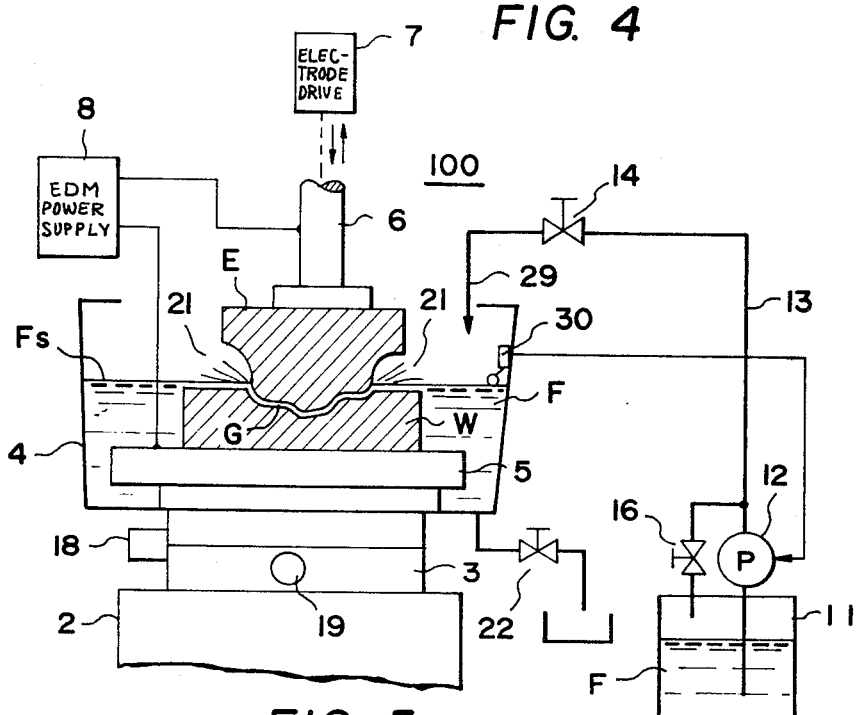
FIG. 4 is a view, similar to that of FIG. 1, diagrammatically illustrating another embodiment of the present invention in which the surface level of the machining fluid in the workpiece is located immediately above the upper surface thereof.

Another embodiment 100 of the apparatus shown in FIG. 4, in which same references are used to designate same or essentially same parts or components as in FIG. 1, is designed to hold the surface level of the machining liquid F retained in the worktank 4 close to the upper surface of the workpiece W. The machining liquid surface located immediately above the upper surface of the workpiece W so as to barely cover it is designated at Fs. So that the surface Fs so positioned is maintained, there is provided a float switch shown at 30. The flow switch 30 is designed to provide a signal acting on the pump 12 in response to a change of the actual surface of the machining fluid F in the worktank 4 from a threshold level Fs. Thus, when the surface exceeds the threshold level Fs, the pump 12 is deactuated or slow down. When the surface drops below the threshold level Fs, the pump 12 is controlled to increase the volume flow of the machining fluid F into the worktank 4. In this manner, the surface of the machining fluid F in the worktank is always maintained at the threshold level Fs.

The machining fluid F is, here again, a noinflammable liquid composed of water and one or more organic substances which may be a silicone oil, ethylene glycol, polyethylene glycol, propylene glycol, glycerin, diethylene glycol, polyalkyl ether and/or a higher (fatty) alcohol. The organic substance is used to increase the molecular weight of the water liquid. It has been found that such an organic substance effectively promotes generation of high-frequency components in a machining discharge, a fact which appears to define high removal rate and reduced electrode wear which are achieved with the particular machining fluid described compared with pure water.

The apparatus 100 of FIG. 4 is so designed that the machining fluid F is designed to be retained in the worktank 4 so as to maintain its surface level at a prescribed threshold level Fs close to and immediately above the upper surface of the workpiece W. The machining fluid F in the worktank W, a portion of which is subjected to machining discharges in the gap G, is allowed to flow off the worktank 4 gradually into the sump 22 while fresh such machining fluid F is added to the worktank 4 through a pipe 29 which communicates with the reservoir 11 via the pump 12. Thus, replenishment of the machining fluid F in the worktank 4 is allowed to continue slowly. In this embodiment, under the conditions described, the machining fluid F in the machining gap G is replenished by reciprocating or intermittently retracting the tool electrode E away from the workpiece W. During each retraction stroke, the machining fluid F in the region of the tool electrode E and the workpiece W, i.e. a portion of the machining fluid F in the worktank 4 which portion lies on the workpiece W, is sucked into the machining gap G. During the tool return stroke that follows, a succession of electrical discharges are progressively created across the gap G being narrowed to electroerosively remove material from the workpiece W while the machining fluid F previously sucked into the machining gap G is pumped out thereof. Discharge products such as machining chips, tar and gases are entrained in the machining fluid F and discharged together therewith out of the machining gap G as illustrated at 21. The cycle is repeated. Thus, the periphery or rim of the machining gap G is held to be substantially contiguous to the atmospheric air without the presence of a substantial amount of the machining fluid as in the conventional system. This allows the gap discharge products to scatter readily or without liquid constraint as in the conventional arrangement and to scatter into regions remote from the gap G almost upon the occurrence of each electrical discharge.

EXAMPLE V

Figure 5:
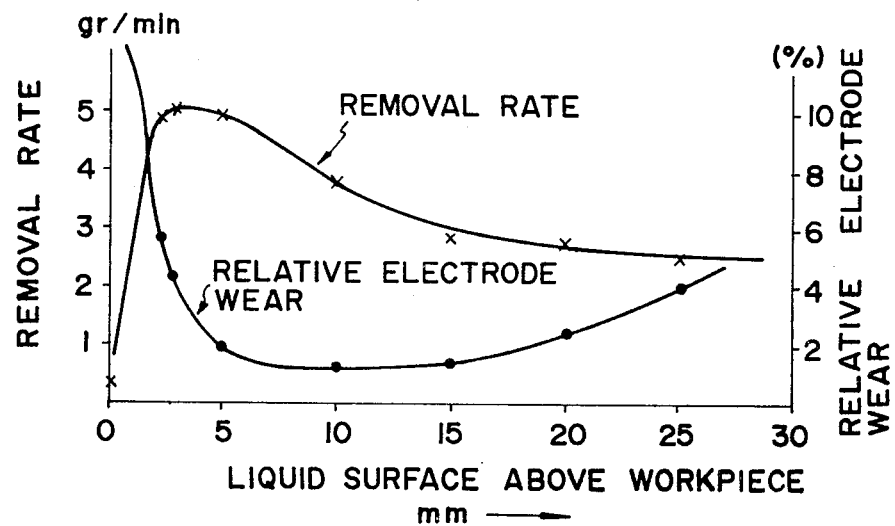
FIG. 5 is a graphical representation showing how the thickness of the machining fluid above the workpiece affects removal rate and relative electrode wear.

A steel workpiece W was machined with a copper electrode in an arrangement generally shown in FIG. 4. The machining fluid F consisted of 1% by weight a polyether denaturated silicone oil and the balance distilled water having a specific resistance of $3 \times 10^4$ ohm-cm. Machining pulses had a peak current of 70 amperes and a pulse duration of 280 μsec. Results of the test are represented by the graph shown in FIG. 5 in which removal rate and relative electrode wear are plotted along the ordinates and the thickness of the machining fluid F above the upper surface of the workpiece W is plotted along the abscissa. It is seen that when the thickness of the machining fluid is adjusted at 2.6 mm, removal rate is at its maximum, reaching a value of 5 g/min, i.e. nearly twice greater as that attainable in the conventional system. When the fluid thickness exceeds 15 mm, there is no substantial difference in removal rate from the conventionally attainable value. The relative electrode wear is sharply reduced when the fluid thickness exceeds 2 mm. A minimum relative electrode wear of 1% is reached with a fluid thickness of 5 mm. In general the relative electrode wear is at its minimum with the fluid thickness ranging between 5 and 20 mm. It is thus seen that best machining results are obtained with the fluid thickness ranging between 2 and 10 mm.

While the embodiment of FIG. 4 is shown and described to supply the machining fluid F into the machining gap G via the worktank 4, it should be noted that the tool electrode E as in FIG. 1 may be provided with one or more internal fluid passages open to the machining gap G. Such fluid passages should as in FIG. 1 be then arranged to communicate with the fluid source 14, 13, 12, 11 to supply the machining fluid F under pressure continuously or intermittently into the machining gap G.

What is claimed is:

1. An EDM method of machining an electrically conductive workpiece to form a cavity therein, comprising the steps of:
   (a) spacedly juxtaposing a tool electrode with said workpiece in a working receptacle to define an EDM gap between said tool electrode and said workpiece so as to be substantially contiguous to atmospheric air in said receptacle, said tool electrode having a machining surface complementry in shape with said cavity and being of an area in excess of 2 cm$^2$;
   (b) supplying a dielectric machining fluid into said EDM gap while substantially maintaining the gap contiguity to said atmospheric air in said receptacle, said dielectric machining fluid being a water-based dielectric liquid;
   (c) effecting a succession of electrical discharges between said tool electrode, poled essentially positive, and said workpiece, poled essentially negative, across said liquid-suppled EDM gap maintained substantially contiguous to said atmosphere to electroerosively remove material from said workpiece while permitting gap fluid and discharge products to splash and flush out of said EDM gap into said atmospheric air in said receptacle; and
   (d) relatively displacing said tool electrode and said workpiece while maintaining said EDM gap substantially constant to advance the material removal in said workpiece.

2. The method defined in claim 1, further comprising the step of controlling the supply of said dielectric water-base liquid into said gap at a volume flow rate ranging between 10 and 1000 cc/min.

3. The method defined in claim 1 wherein said workpiece is disposed in said receptacle so as to be surrounded by said atmospheric air.

4. The method defined in claim 1 wherein such a volume of said machining fluid is retained in said receptacle as to barely cover said workpiece disposed therein.

5. The method defined in claim 4 wherein the depth of the machining fluid above the upper surface of said workpiece ranges between 2 and 15 mm.

6. The method defined in claim 5 wherein said depth of is not greater than 10 mm.

7. The method defined in claim 1 wherein said water-base dielectric liquid consists of 0 to 5% by weight at least one hydrocarbon, 1 to 5% by weight at least one organic substance other than hydrocarbons and the balance essentially water.

8. An EDM method of machining an electrically conductive workpiece to form a cavity therein, comprising the steps of:
   spacedly juxtaposing a tool electrode with the workpiece to define an EDM gap therebetween so as to be substantially contiguous to atmospheric air in a working receptacle, said tool electrode having a machining surface complementary in shape with said cavity and being of an area in excess of 2 cm$^2$;
   supplying into said EDM gap a water-based dielectric liquid consisting of 0 to 5% by weight at least one hydrocarbon, 1 to 5% by weight at least one organic substance other than hydrocarbons and the balance essentially deionized water;
   while replenishing said water-base dielectric liquid into said EDM gap as slow a volume flow rate as up to 100 cc/min and maintaining said liquid-replenished EDM gap substantially contiguous to the atmospheric air in said receptacle, effecting a succession of electrical discharges between said tool electrode and said workpiece across said gap to electro-erosively remove material from the workpiece and to allow gap discharge products to scatter into said atmospheric air; and
   relatively displacing said tool electrode and said workpiece while maintaining said EDM gap substantially constant to advance the erosive removal in said workpiece.

9. An EDM method of machining an electrically conductive workpiece with a tool electrode having a formed machining surface of an area in excess of 2 cm$^2$ to form in the workpiece a cavity complementary in shape with said machining surface wherein said machining surface and the workpiece are spacedly juxtaposed across an EDM gap filled with a dielectric machining fluid in a working receptacle, the method comprising the steps of:
   introducing into the working receptacle a water-base dielectric liquid consisting of 0 to 5% by weight at least one hydrocarbon, 1 to 5% by weight at least one organic substance other than hydrocarbons and the balance essentially deionized water to constitute said machining fluid so as to barely cover said workpiece therewith and so that a thin layer of such liquid lies above said workpiece in said receptacle;
   effecting a succession of electrical discharges between said machining surface and said workpiece across said EDM gap in the presence of said water-based dielectric liquid to electro-erosively remove material from the workpiece and to allow gap discharge products to scatter and thereby to be discharged from the EDM gap;
   slowly replenishing said water-based dielectric liquid into the EDM gap at least partly from said layer while replenishing said water-base dielectric liquid into said receptacle so as to maintain the thickness of said layer in excess of 2 mm but not to exceed 10 mm; and
   relatively displacing said tool electrode and said workpiece while maintaining said EDM gap substantially constant to advance the erosive removal in said workpiece.

10. The method defined in claim 7, claim 8 or claim 9 wherein said organic substance is at least one substance selected from the group which consists of a silicone oil, ethylene glycol, polyethylene glycol, propylene glycol, glycerin, diethylene glycol, polyalkyl ether and a higher (fatty) alcohol.

11. The method defined in claim 10 wherein said silicone oil is a polyether denaturated silicone oil.

12. The method defined in claim 7, claim 8, or claim 9 wherein said organic substance is a non-ionic surface active agent.

13. The method defining in claim 9 wherein said water-base dielectric liquid is replenished into said EDM gap at a volume flow rate ranging between 10 and 1000 cc/min.

14. The method defined in claim 13 wherein said flow rate is not more than 100 cc/min.

15. The method defined in claim 7, claim 8 or claim 9 wherein said deionized water has a specific resistivity in excess of $10^3$ ohm-cm.

* * * * *